Figure 4:
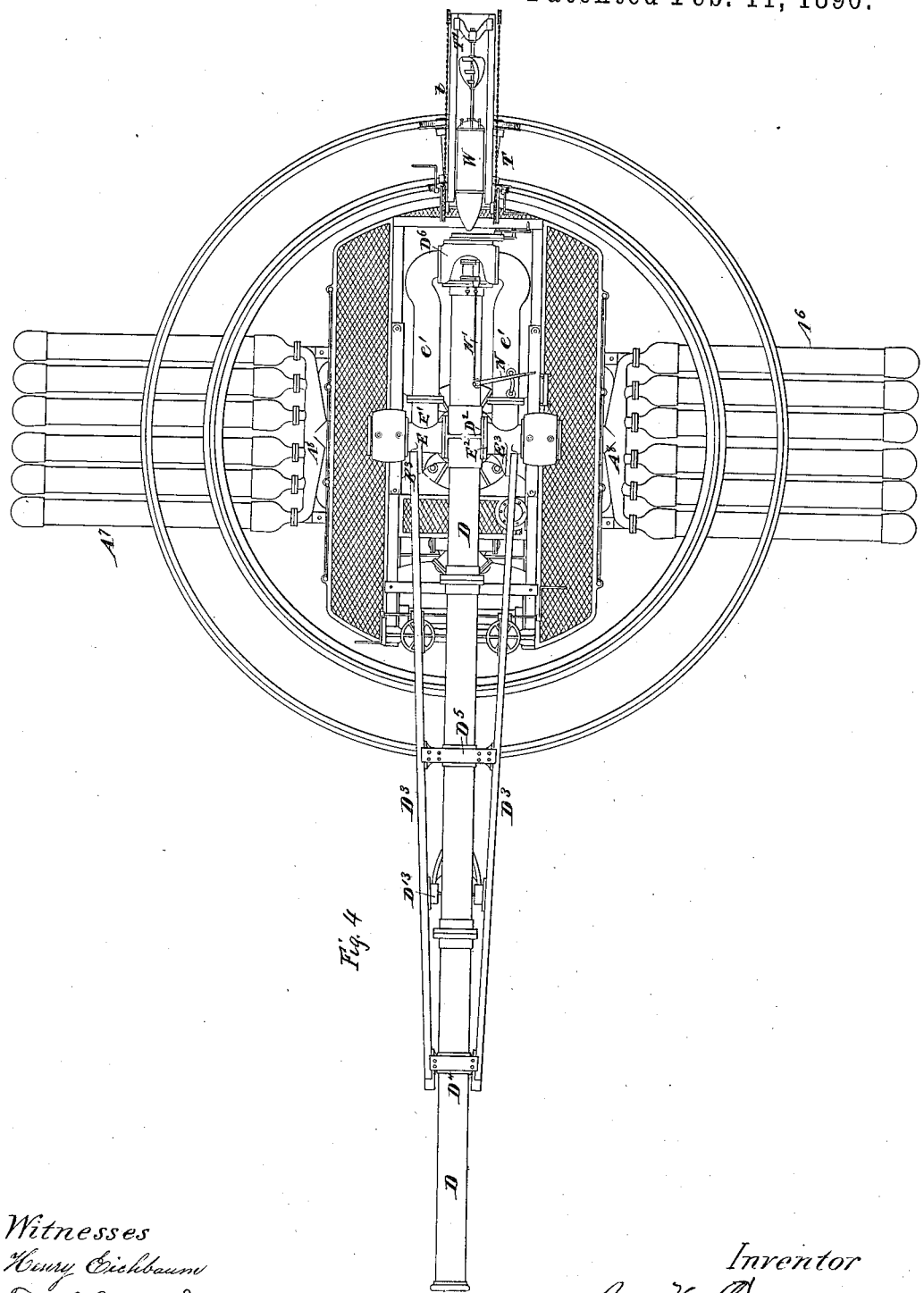

(No Model.)  
11 Sheets—Sheet 1.
G. H. REYNOLDS.
PNEUMATIC GUN.
No. 421,306.  
Patented Feb. 11, 1890.
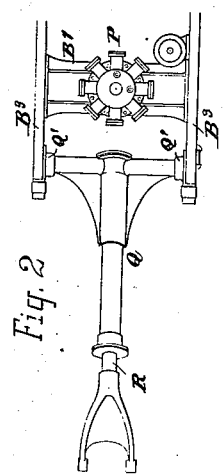
Fig. 2
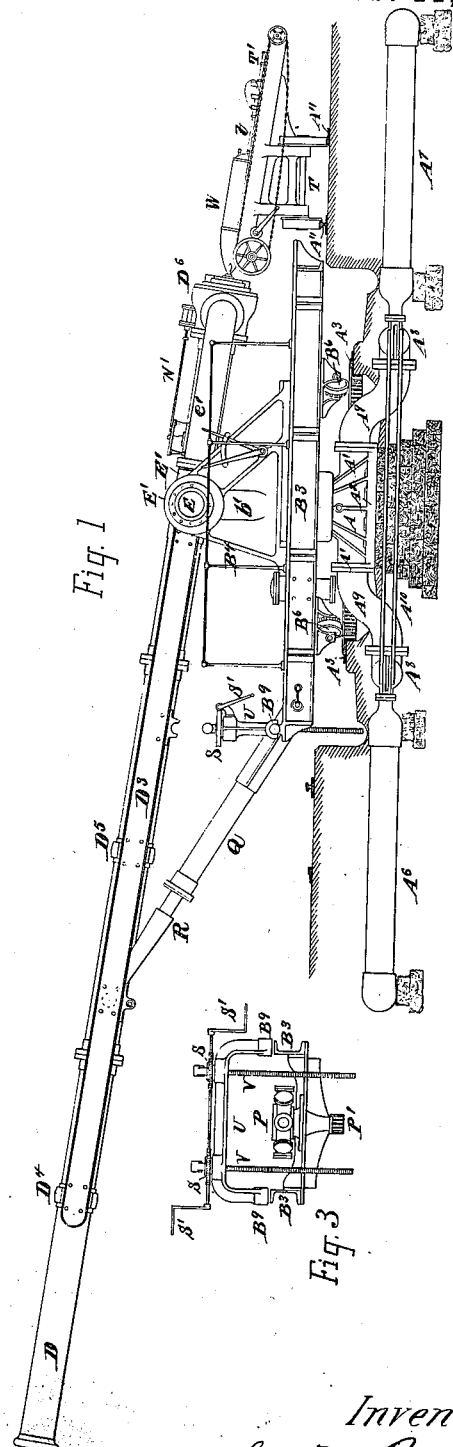
Fig. 1
Fig. 3
Witnesses  
Henry Eichbaum  
Frank Bowne Jones
Inventor  
Geo. H. Reynolds (No Model.)

11 Sheets—Sheet 2.

G. H. REYNOLDS.
PNEUMATIC GUN.

No. 421,306.

Patented Feb. 11, 1890.

Witnesses
Henry Eichbaum
Frank Bowne Jones

Inventor
Geo. H. Reynolds (No Model.)
G. H. REYNOLDS.
PNEUMATIC GUN.
No. 421,306. Patented Feb. 11, 1890.
11 Sheets—Sheet 3.
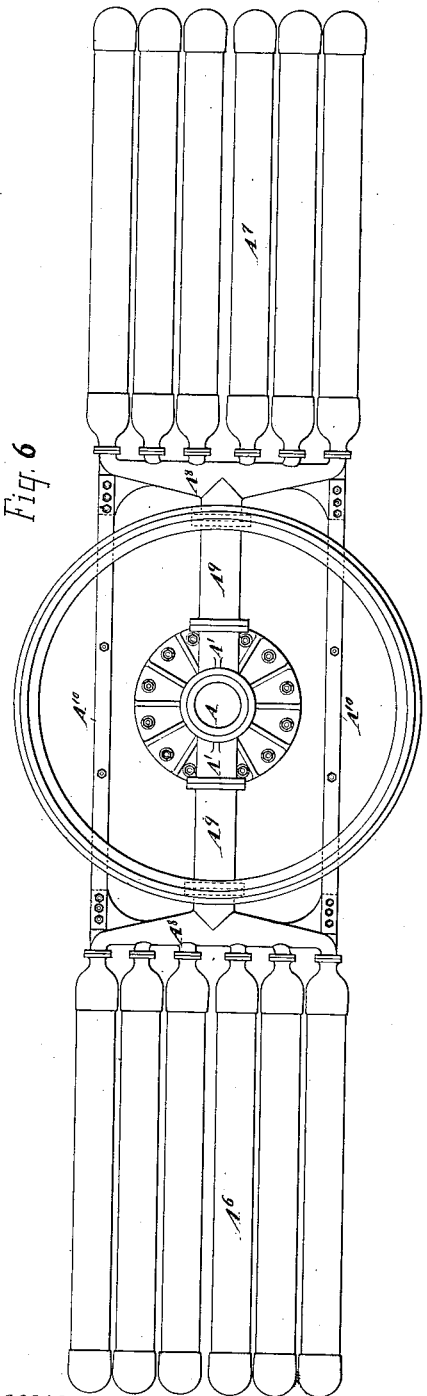
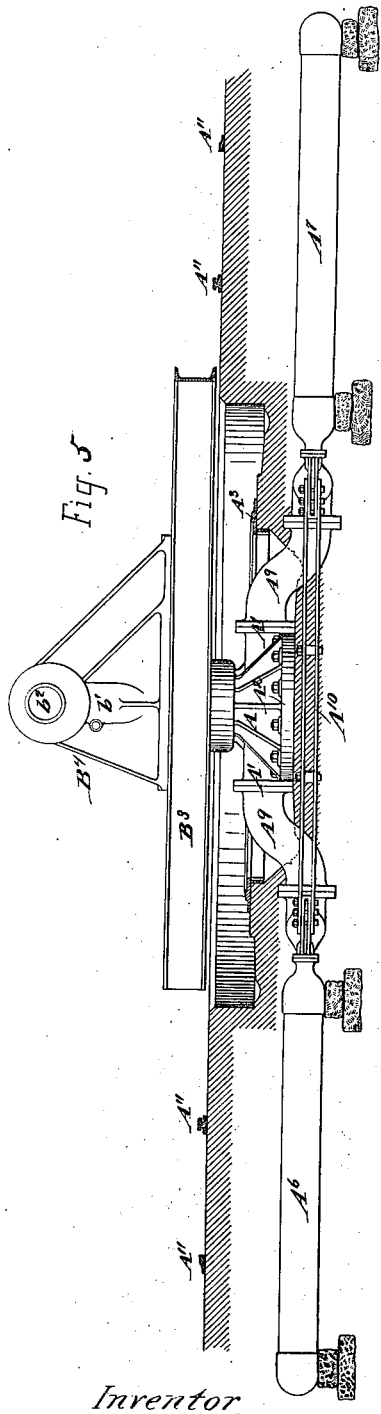

(No Model.)
11 Sheets—Sheet 4.

G. H. REYNOLDS.
PNEUMATIC GUN.

No. 421,306. Patented Feb. 11, 1890.

Witnesses
Henry Eichbaum
Frank Bowne Jones

Inventor
Geo. H. Reynolds

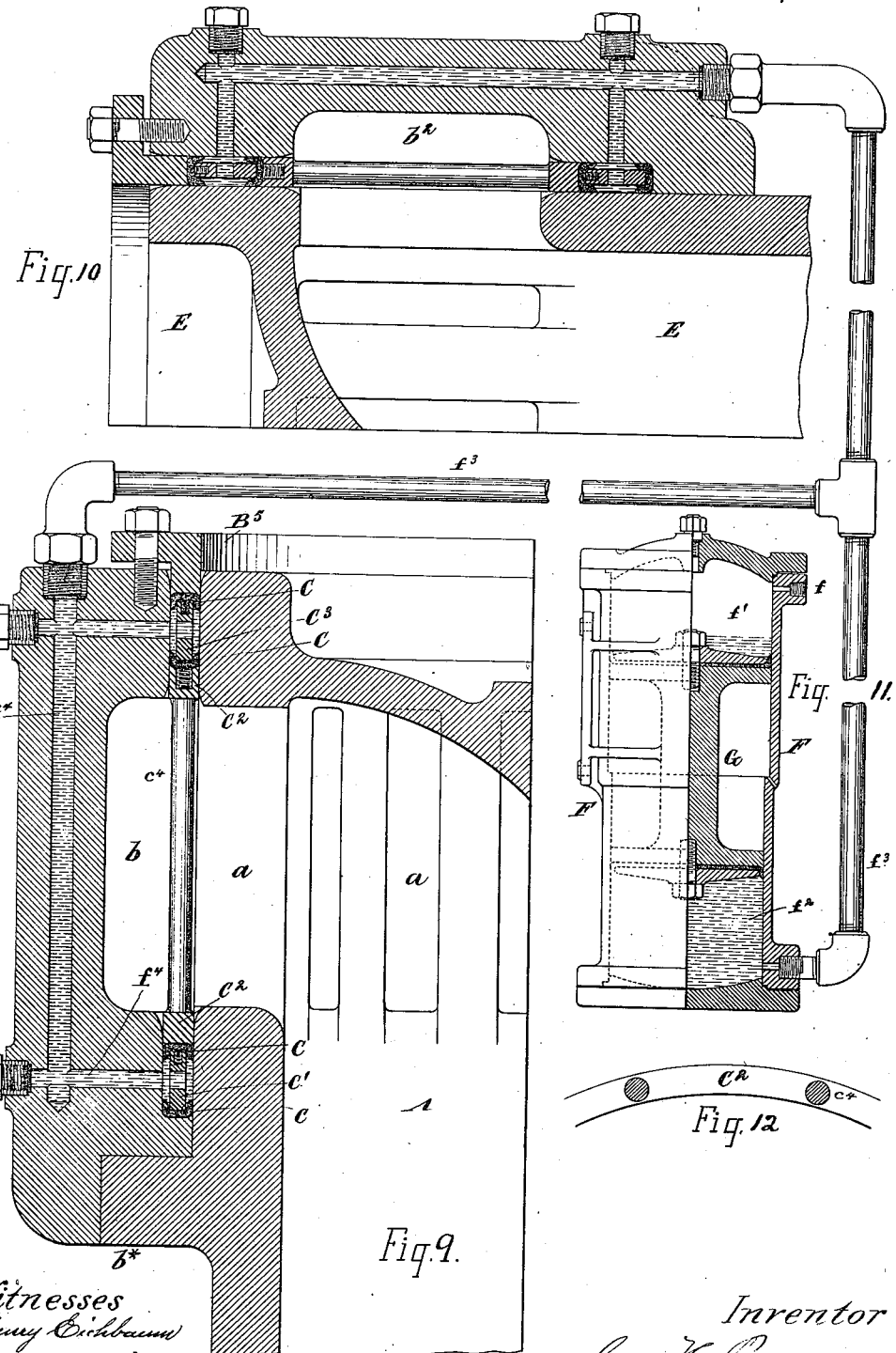

(No Model.)  11 Sheets—Sheet 6.

G. H. REYNOLDS.
PNEUMATIC GUN.

No. 421,306.  Patented Feb. 11, 1890.

Witnesses
Henry Eichbaum
Frank Bowne Jones

Inventor
Geo. H. Reynolds (No Model.) 11 Sheets—Sheet 7.
G. H. REYNOLDS.
PNEUMATIC GUN.
No. 421,306. Patented Feb. 11, 1890.
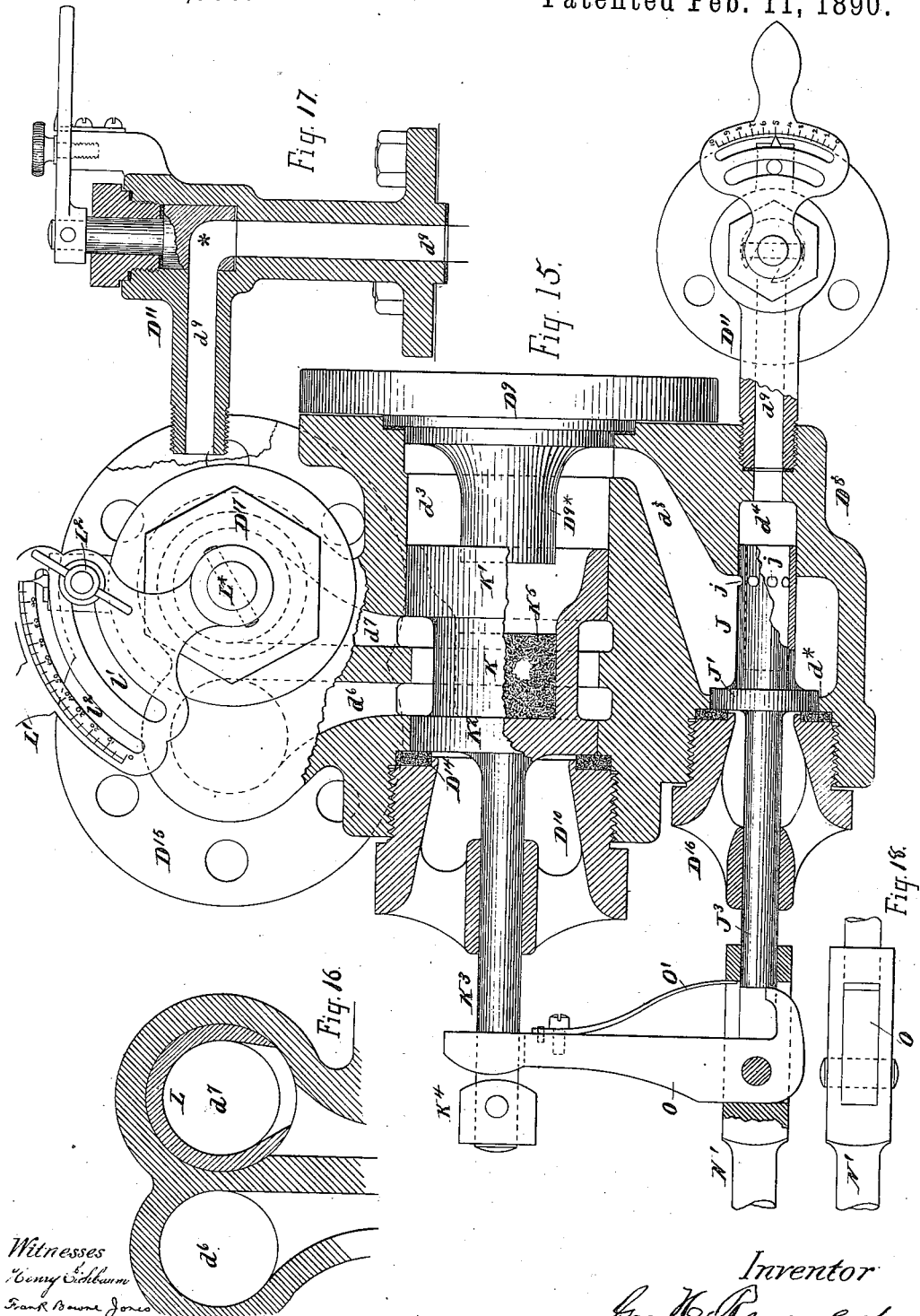
Witnesses
Henry Eichbaum
Frank Bourne Jones
Inventor
Geo. H. Reynolds (No Model.)
G. H. REYNOLDS.
PNEUMATIC GUN.
No. 421,306.  11 Sheets—Sheet 8.
Patented Feb. 11, 1890.
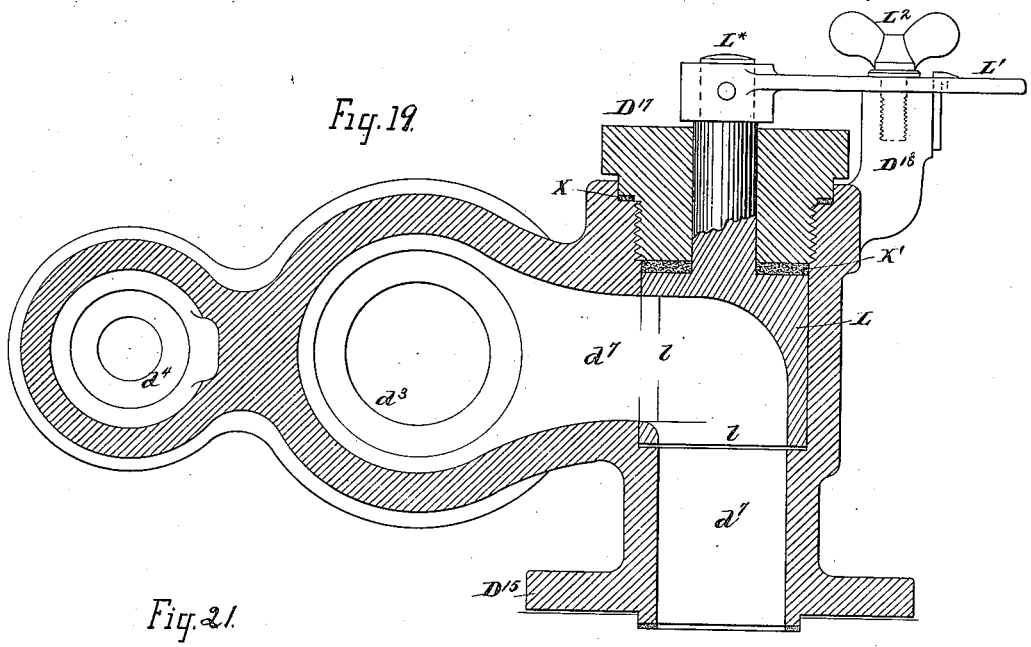
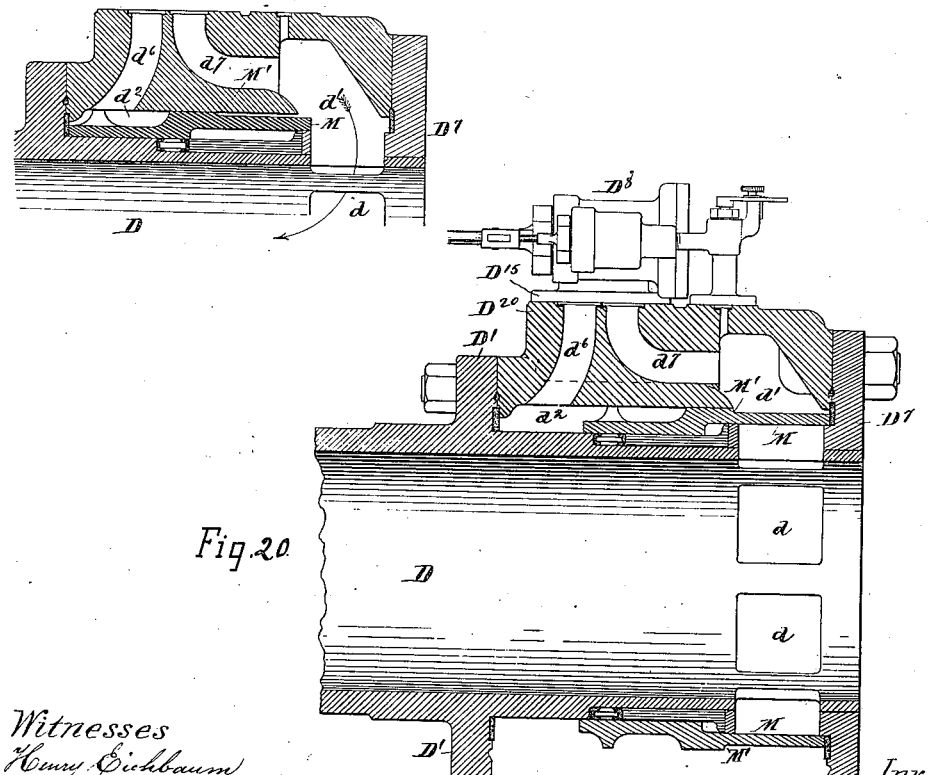
Witnesses
Henry Eichbaum
Frank Bourne Jones
Inventor
Geo. H. Reynolds

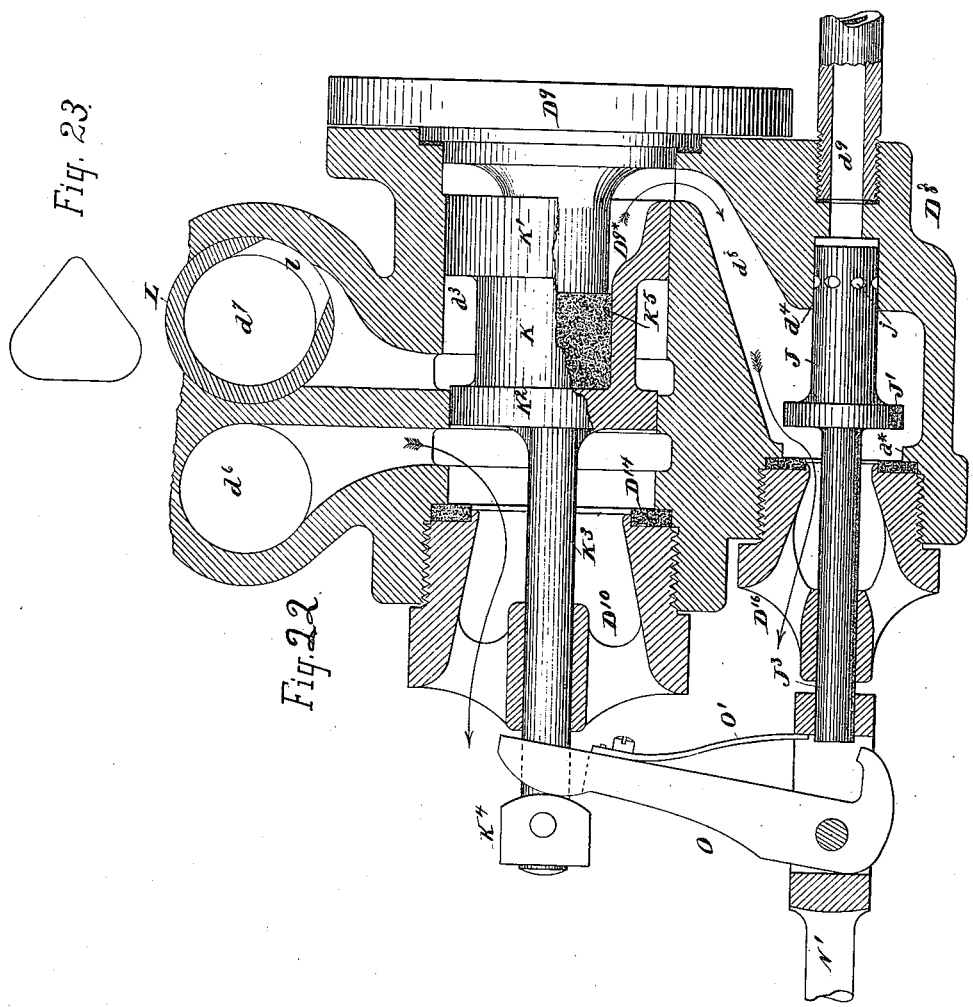

(No Model.) 11 Sheets—Sheet 10.

G. H. REYNOLDS.
PNEUMATIC GUN.

No. 421,306. Patented Feb. 11, 1890.

Witnesses
Inventor (No Model.)
G. H. REYNOLDS.
PNEUMATIC GUN.
No. 421,306.
Patented Feb. 11, 1890.
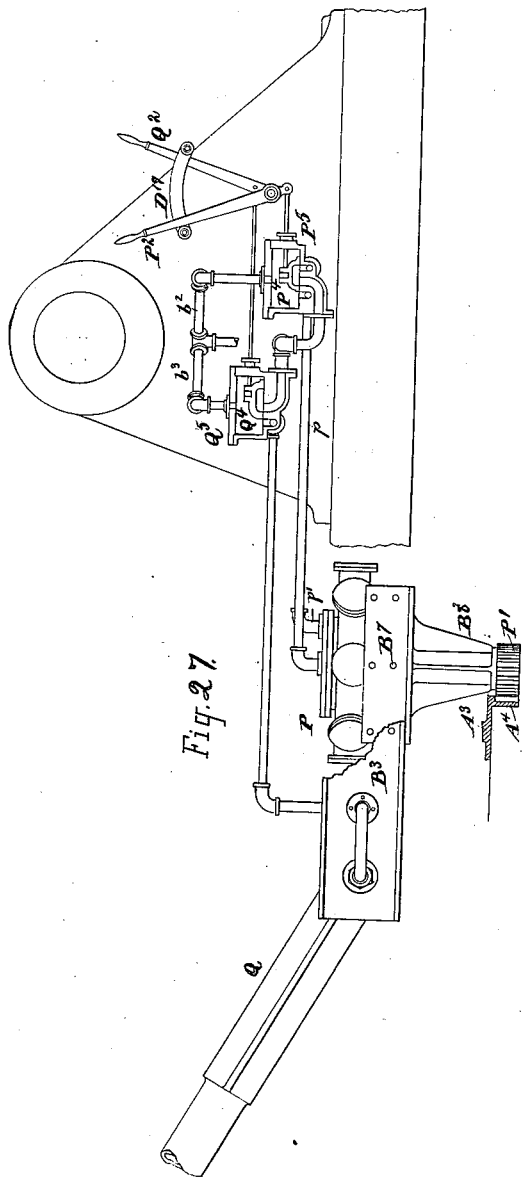
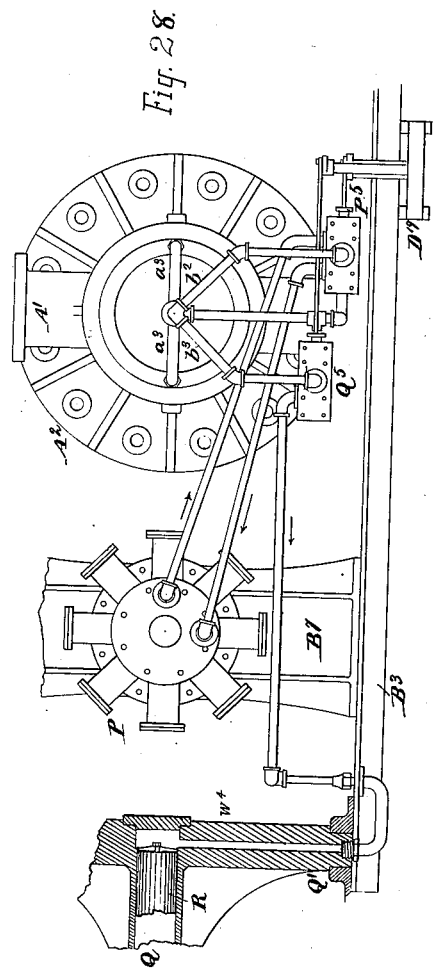
Witnesses
Henry Eichbaum
Frank Bowne Jones
Inventor
Geo. H. Reynolds

UNITED STATES PATENT OFFICE.

GEORGE H. REYNOLDS, OF NEW YORK, N. Y.

PNEUMATIC GUN.

SPECIFICATION forming part of Letters Patent No. 421,306, dated February 11, 1890.

Application filed March 14, 1889. Serial No. 303,218. (No model.)

*To all whom it may concern:*

Be it known that I, GEORGE H. REYNOLDS, of the city and county of New York, in the State of New York, have invented certain new and useful Improvements in Pneumatic Cannon, of which the following is a specification.

The invention is intended more especially for cannon operated by compressed air of high tension and adapted to throw large projectiles containing high explosives; but it may be carried out with a wide range of sizes and of various proportions, and may serve with other gases than atmospheric air, and the pressure of the gas may be induced by other means than mechanical compression.

The objects sought are simplicity and economy of construction and convenience, certainty, and effectiveness of operation.

I will use the word "firing" in its technical sense as used by military men to define the act of discharging the gun, although in this gun there is no ignition of powder or other combustible. I will use the word "air" to designate the large volumes of gas under pressure employed to impel the projectile, and the word "oil" to designate the liquid employed in small quantities with an excess of pressure in the packings, although various other liquids, as water with glycerine, may in practice be substituted.

What I consider the best means of carrying out the invention are fully described below and shown in the accompanying drawings, forming part of this specification. There are twelve (12) sheets of the drawings.

Sheet 1: Figure 1 represents the gun and the mechanism for operating it in side elevation, with the loading-carriage in position to introduce a projectile. In this figure the gun is trained in a plane parallel to the air-reservoirs. Fig. 2 is a plan view of one end of the gun-carriage, showing the hydraulic motor for training the gun and the ram for elevating it; and Fig. 3 is an end view of mechanism provided to elevate the gun by hand, showing also the motor for training.

Sheet 2: Fig. 4 is a plan view of the gun with its carriage and the loading-carriage. In this figure the gun has been trained in a plane across the firing-reservoirs.

Sheet 3: Fig. 5 is a side view of the gun-carriage with the trunnion-blocks thereon mounted upon the pintle, which latter is hollow and forms a central connection for the air and hydraulic pressure to pass through from the stationary to the movable parts of the system. Fig. 6 represents a plan of the reservoirs in reference to the center of the gun and to each other.

Figure 7:
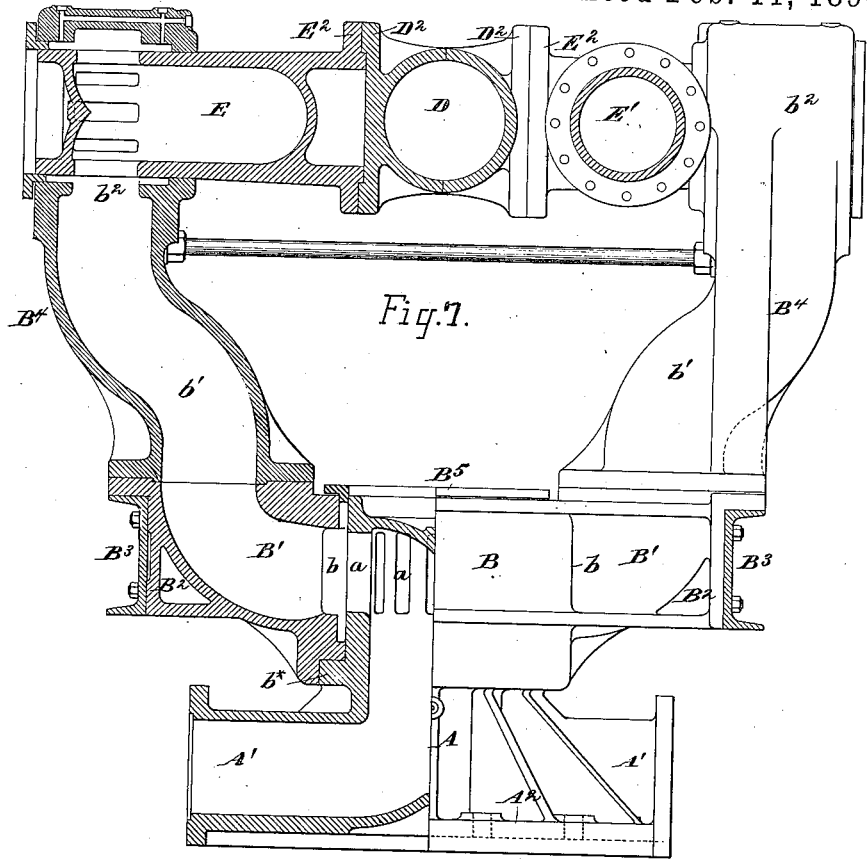
Figure 8:
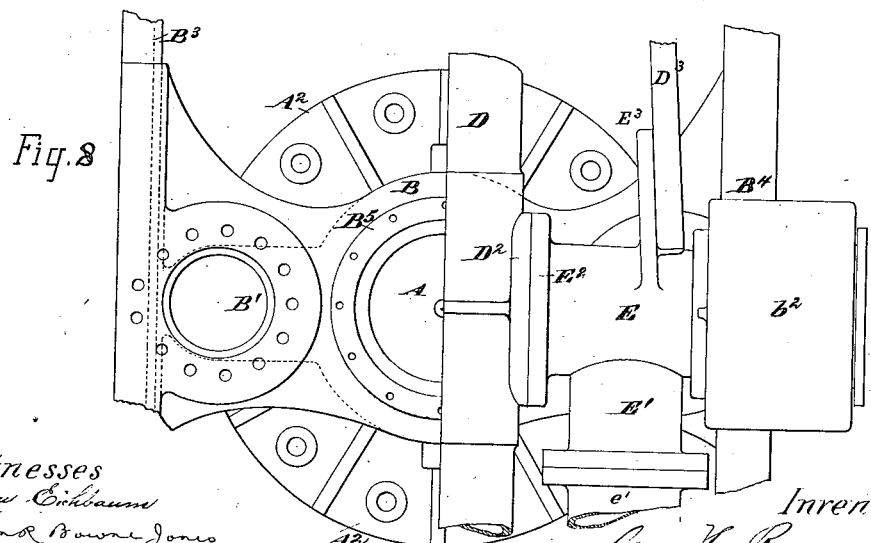

Sheet 4: Fig. 7 is an end elevation of the gun-carriage frame with the trunnion-blocks centered on the pintle, one-half of this view being shown in section. Fig. 8 is a plan view of the above parts, half of the upper portion being taken away.

Sheet 5 represents my improved packings for the pintle and trunnions and the differential cylinder for producing hydraulic pressure for the same, as hereinafter described. Fig. 9 is a vertical section through one-half of the bearing parts of the pintle. Fig. 10 is a corresponding section through one-half of the bearing parts of one trunnion, and Fig. 11 of the differential cylinder with its two pistons. The figures also show portions of the necessary pipes for conveying the pressure to these packings. Fig. 12 is a cross-section through a portion of the double ring used in the packing.

Figure 13:
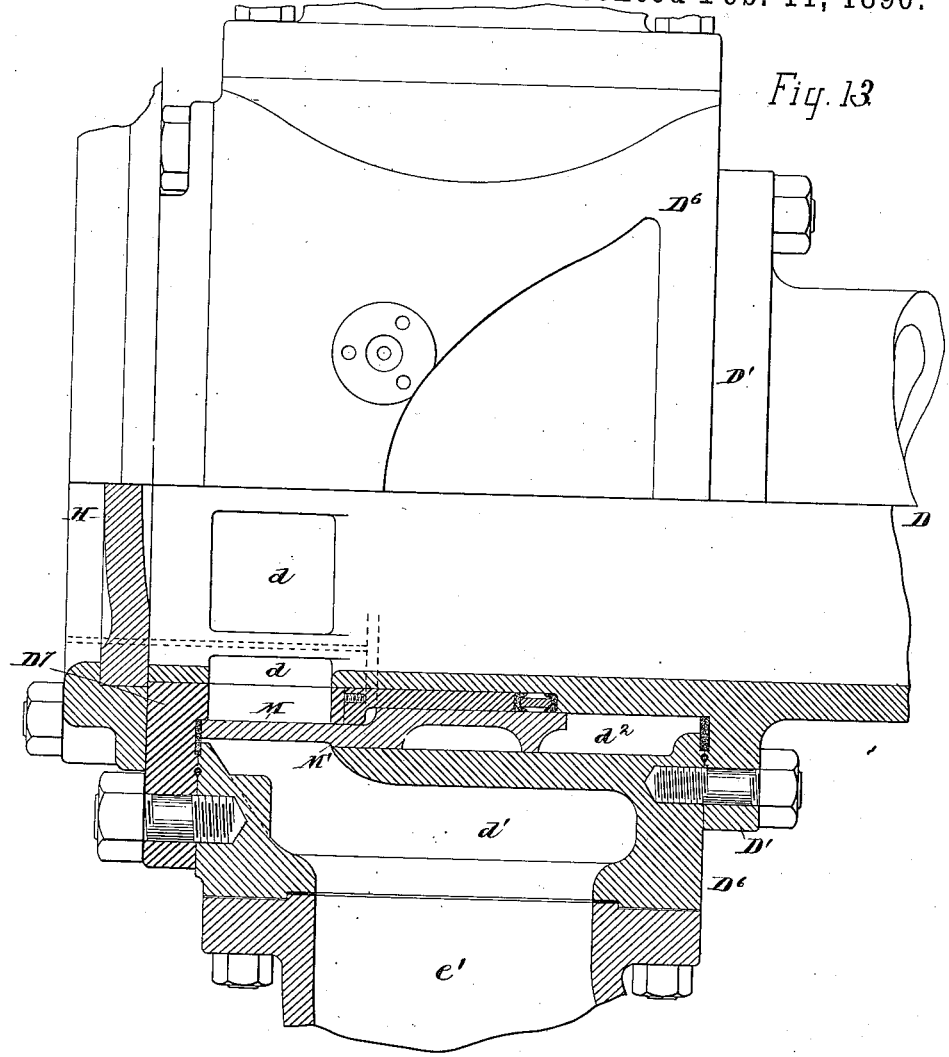
Figure 14:
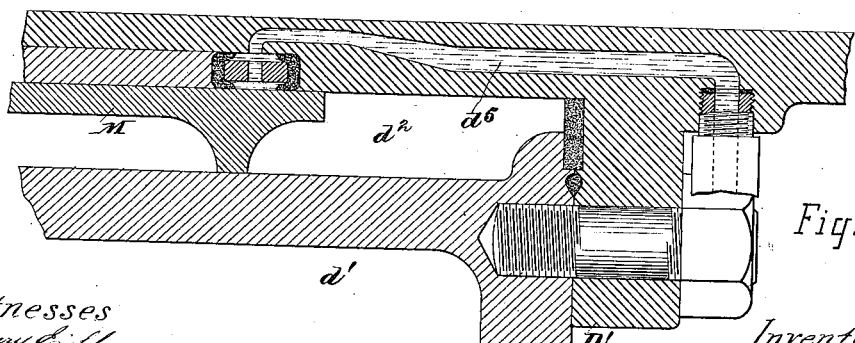

Sheet 6: Fig. 13 is a plan view of the breech of the gun, partly in section. This figure shows the junction of the side pipes with an exterior annular chamber, which I term the "pressure-belt," and the section shows the annular firing-valve and the gate or breech-block, which is removed to allow the projectile to be introduced into the gun. Fig. 14 is a corresponding section through a portion in a different plane. This figure is on a larger scale and shows clearly the manner of applying pressure to the packing.

Sheet 7: Fig. 15 is a plan view, partly in section, of the two auxiliary valves for operating the main or firing valve so as to open the apertures around the breech of the gun with the required promptness and completeness, hold them open the brief period desired, and automatically close them again without wasting the store of air. Fig. 16 is a horizontal section of the air-ducts leading to and from the firing-valve chamber, controlled by the auxiliary valves. Fig. 17 is a vertical section of the regulating device for controlling the period the firing-valve shall remain open; and Fig. 18 is a side view of the tripping catch or lever, which performs important functions.

Sheet 8: Fig. 19 is a vertical section through the auxiliary valve. Fig. 20 is a vertical section of the breech of the gun, showing the manner in which the auxiliary valves are related to the firing-valve, with the firing-valve closed; and Fig. 21 is a vertical section of the same parts, showing the firing-valve during the period while it is momentarily open.

Sheet 9: Fig. 22 is a plan view, partly in section, of the auxiliary valves in their open position. Fig. 23 shows the shape of the aperture against which the regulating stop-cock works.

Figure 25:
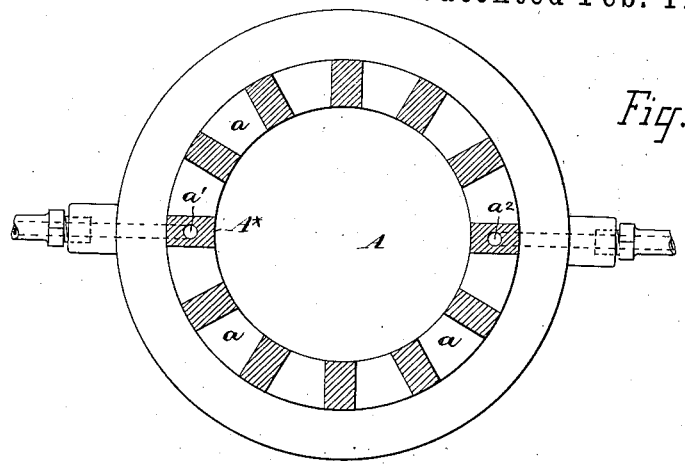
Figure 24:
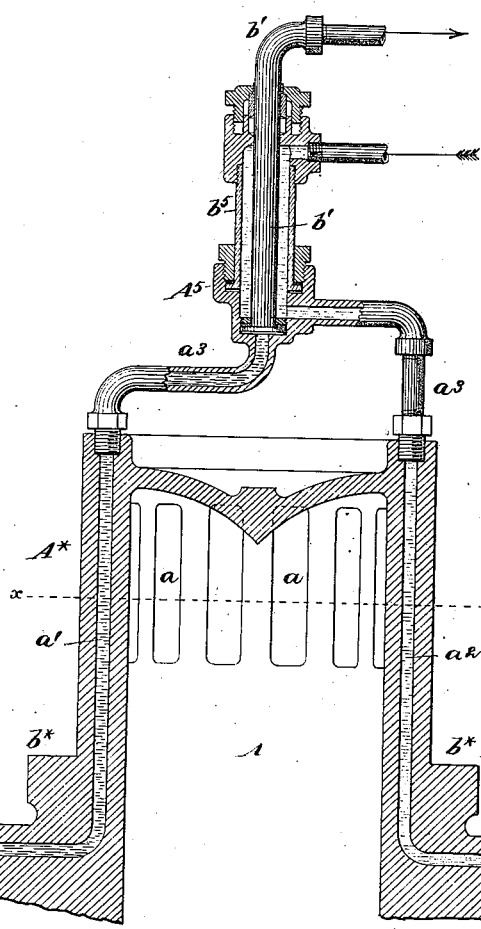
Figure 26:
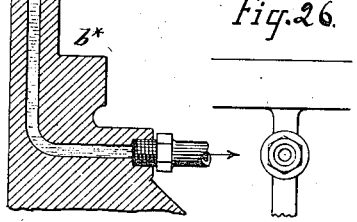

Sheet 10: Fig. 24 is a central vertical section of the pintle, showing the two ducts—one for conveying hydraulic pressure from the stationary parts of the system to operate the machinery for training and elevating the gun, the other allowing the return of the oil or other liquid after having performed this service. Fig. 25 is a cross-section on the line $xx$ in Fig. 24. Fig. 26 is a front view of one of the nozzles on the pintle.

Sheet 11: Fig. 27 is a side elevation, partly in vertical section, showing the mechanism for training and elevating the gun; and Fig. 28 is a plan, partly in horizontal section, of the same.

Similar letters of reference indicate corresponding parts in all the figures where they occur.

A designates the central pintle, which is securely fastened by bolts to a substantial foundation. (See Sheet 1, Fig. 1, Sheet 4, Figs. 7 and 8, and Sheets 10 and 11, in which latter its construction is fully shown.) It consists of a single hollow casting with liberal apertures combining the following features: first, as a sufficient and solid center around which the gun trains, receiving the recoil of the gun; secondly, as a passage for the air under heavy pressure from the firing-reservoirs to the gun, and in this respect it is so constructed that the strains resulting from this pressure are self-contained, it being closed at the top and bottom, and, thirdly, serving also for the passage to and fro of the motive fluid from the stationary to the movable parts of the apparatus. The air enters from the firing-reservoirs by the two nozzles A' and issues from it through a number of openings $a$, which being made around the circumference of the pintle the pressure is balanced in all directions. To receive the recoil of the gun, the pintle is provided with a heavy flange $A^2$, re-enforced by ribs around it. (See Sheet 4.) The pintle is also constructed with ducts $a'$ $a^2$ (shown in Sheet 10) for the passage to and from the gun of the oil or other fluid under pressure, by which the gun is trained and elevated. Encircling the upper portion of this pintle and resting on an annular flange $b^*$ thereof is a casting which I call the "yoke" B, carrying the gun and carriage. The center opening of this yoke is bored to a working fit upon the pintle. It is provided with a belt $b$, (see Sheet 4,) into which the air passes from the pintle through the openings $a$, and from this belt the air passes by two nozzles B' on opposite sides of the yoke, thus relieving the parts from any unbalanced strain. The yoke is provided with flanges $B^2$ for attachment to the longitudinal framing of the gun-carriage, which consists of two heavy channel-bars $B^3$, Sheets 1 and 3. The yoke, with its load, is capable of turning in a complete circle around the pintle, and the flow of air is not obstructed by this movement, the opening $s'$ in the pintle being at all times in full communication with the belt. Securely bolted to this yoke are the trunnion-blocks $B^4$. (See Sheets 1, 2, and 3, and on a larger scale in Fig. 7, Sheet 4.) Each trunnion-block consists, mainly, of a pipe $b'$ of suitable diameter, rising from the yoke to the gun-trunnion, supported by ribs and flanges sufficient to resist the recoil when the gun is fired. To receive the trunnions of the gun, the pipes swell into and terminate in chambers $b^2$, bored to fit them.

One of the important features of my invention is in the means which I adopt to prevent the escape of air through the joints of the pintle and trunnions. Ordinary cup-leather packings are tight under hydraulic pressure; but I have proved it to be impossible to retain air under heavy pressure by such packing. I have devised means for making such joints absolutely tight. The principle by which I accomplish this is to oppose the pressure of the air by a greater pressure of some dense liquid, as oil, which will not readily, if at all, pass through the leather or other flexible material used in the form of reversed cup-leathers as packing for the joint.

$a$ is one of the openings in the pintle, and $b$ the annular chamber or belt in the yoke. To receive the packings, I bore a recess in the yoke above and below the belt, (see Sheet 5,) and fill these recesses with my improved packings. C is a U-shaped packing-ring, made of any suitable flexible material, as leather, fitting into the recess and extending entirely around the pintle. C' is a distance-ring, of metal, fitting between the ring C and another U-shaped packing-ring similar to the ring C, but mounted in a reversed position. $C^2$ indicates two distance-rings cast in one piece by connecting-bars bridging the opening. Two of these bars are shown in section in Fig. 12, Sheet 5. Having thus packed one side of the opening, I place a similar arrangement of U-shaped packing-rings C, with their distance-ring $C^3$ on top of the double distance-ring $C^2$. To secure all these rings in position, I fit a metal gland $B^5$ into the remaining portion of the recess, the flange of which gland is held by bolts to the yoke, and by screwing down these bolts any required pressure can be brought upon the system of packings making the joint. I introduce between each pair C C of reversed flexible packings oil or other dense liquid under a greater pressure than that of the compressed air. The distance-rings C' C³ are thin, so that a space is left on either side of them, and each one is perforated with one or more holes to allow of communication between the spaces so provided. I provide means for having always just the required excess of pressure in the oil.

Fig. 11: Sheet 5 represents a cylinder F, of two different internal diameters, and a piston G, in one piece, fitting in each. The space $f'$ above the piston is connected through the pipe $f$ with the interior of the pipes A⁹, so that the large upper face of the piston is always under the same pressure as the air being used in the gun, no matter how much such pressure may fluctuate. A sufficient amount of oil is kept above this piston to constitute a hydraulic packing. The lower part $f^2$ of the cylinder F, which is of less diameter than the upper, is filled with oil and is connected by suitable pipes $f^3$ to the yoke, and by holes $f^4$, made for the purpose, the oil is led to and fills the spaces between each pair of the packings C C, obtaining access to both sides of the distance-rings C' C³ through the perforations therein. I find by trial that an excess of about ten per cent. of hydraulic pressure over the air-pressure is sufficient to make these packings tight, and accordingly I make the two parts of the differential cylinder of such diameters that the area of the piston that is exposed to the pressure of the air in the pintle is about ten per cent. in excess of the area of the part that bears on the oil in the lower and smaller part of the cylinder. In illustration of this action of the differential pistons I remark that if the normal pressure of air in the firing-reservoirs, pintle, and air-passages of the gun be one thousand pounds per square inch before firing the gun the hydraulic pressure for packing these joints will be about eleven hundred pounds per square inch. If in the act of firing the air-pressure falls, say, to nine hundred pounds in the reservoir, pintle, &c., the oil-pressure will then be about nine hundred and ninety pounds in the packing, in both cases sufficient to absolutely prevent the leakage of air. The packings around the trunnions are precisely similar to those above described for the pintle-joint, and are similarly connected with the differential cylinder. (See Sheet 5, Fig. 10.)

One peculiarity of my construction is that I make the trunnions E separate from the barrel D, (see Sheets 1, 2, and 4,) whereby I render the construction easier and incur less risk of defects in material. The trunnions are made like the pintle in the respect that both ends are closed and strains from pressure self contained, and the air is similarly admitted through openings around their circumferences. Each trunnion is provided with a nozzle E', looking toward the breech of the gun, from which nozzle a pipe $e'$ (see Sheet 2) is led to the casing of the firing-valve. The trunnions are provided with heavy flanges E², corresponding to flanges D² on the barrel, to which they are firmly bolted. The rear end of the barrel is turned thin and receives the breech-ring D⁷, one part of which is cylindrical and forms in effect an enlargement of the exterior surface of the barrel, having openings coinciding with the openings $d$. This breech-ring has a stout flange, which forms a seat for the annular firing-valve. The forward end of the barrel D is supported laterally by a truss consisting of two channel-bars D³—one on each side of the barrel—one end of the bar being bolted to a flange E³, provided for the purpose on the trunnion, the other two ends being united by means of strong clamps D⁴ D⁴, encircling the gun-barrel at that point. Similar clamps D⁵ D⁵, encircling the barrel, unite the channel-bars near the center of their length. At the breech of the gun the barrel is embraced within the firing-valve casing D⁶, which, with the breech-block H, is bolted to a heavy flange D', cast upon the barrel a little forward from the breech. (See Sheet 6, Fig. 13.)

D is the barrel.

D' is the flange to which the valve-casing D⁶ is bolted, and D⁷ is a piece, which I call the "breech-ring," surrounding the barrel and flush with its end and to which the breech-block H is secured.

Near the end of the barrel are openings $d$, through which air is admitted for the purpose of propelling the projectile W.

The firing-valve casing D⁶ is connected to the trunnions by two side pipes $e'$. (See Sheets 2 and 6.) It incloses an annular hollow or belt $d'$, wide at the two places where the air enters from the pipes $e'$, but narrow above and below the barrel. In another annular chamber $d^2$ between the belt $d'$ and the barrel D is fitted the annular firing-valve M, free to slide endwise to effect the opening and closing. It is shown against its seat on the breech-ring in Sheet 6, Fig. 13, and against its buffer-seat on the flange D' in Sheet 8, Fig. 26. When against the seat on the breech-ring, the valve is in its closed position, covering the openings in the breech-ring and barrel and shutting off the air from the barrel. When the valve is against the buffer-seat on the flange D', it is in the open position, exposing the openings and allowing the free flow of air from the belt in the valve-casing into the barrel. When the firing-valve is closed, it is held to its seat in the breech-ring by the pressure in the chamber $d^2$ at the back of the valve, which is the same as that existing in the belt $d'$, there being a connection between these two spaces which will be described farther on. The pressure being equal in these two spaces, there is no disposition on the part of air to pass from one to the other while the valve is closed; but unless prevented the air under pressure would leak out around the inner circumference of the valve at the point between it and the outer circumference of the barrel. In order to prevent such leakage, I place one of my improved packings between the valve and the barrel. (Shown in Fig. 1, and enlarged in Fig. 20, shown also in Fig. 2, Sheet 8.) This packing is formed of two U-shaped flexible packing-rings with a perforated distance-ring between them, similar to those around the pintle and trunnion, and to make these packings absolutely tight I bring the same hydraulic pressure from the differential cylinder to act upon them. For the purpose of conveying the liquid-pressure between these packings, I form a passage $d^5$, Fig. 14, Sheet 6, in the thickness of the barrel, from the outside of the barrel to the point desired, and connect this passage with the differential cylinder F. (See sheet 5, Fig. 11.) The liquid used in this packing serves also to lubricate the inside surface of the valve.

As the firing-valve in a large cannon is a heavy piece of metal, and is held to its seat by an enormous pressure, it becomes necessary to provide means to open and close it, which, while amply sufficient, both in force and rapidity of action, to operate the valve, shall be under the perfect control of the gunner. This is the more necessary because, while the pressure maintained in the reservoirs is supposed to be uniform (in practice about one thousand pounds per square inch,) it is desirable and necessary to vary the quantity of air which is introduced into the gun behind the projectile according to the distance to which it is designed to throw the projectile. If, for instance, it is desired to throw the projectile to the greatest range the gun may have, the valve is opened wide and remains open until the projectile reaches the muzzle. If, on the other hand, it is necessary to throw the projectile a short distance only, the pressure of the air is cut off by closing the valve at such time as is found by experience to give the range desired.

The force I make use of to open and close the firing-valve is the pressure of the air in the reservoirs and pipes of the gun, and which may exist undiminished in the annular chamber $d^2$ of the firing-valve casing. The principle upon which I use this pressure may be explained as follows: In the annular chamber $d^2$, in which the valve plays, there exists, as has already been explained, the same pressure as in the chamber $d'$ and the pipes and reservoirs, and this pressure, acting on the back of the valve M, forces it upon its seat. If the communication between the chamber $d^2$ and the chamber $d'$ were cut off and the space in the chamber $d^2$ opened to the outside atmosphere, the pressure in $d^2$ would disappear. The firing-valve would then be acted upon by the reservoir-pressure on the shoulder of the valve at the point M', which would then force the valve back in its chamber against the buffer-seat on the flange D'. Here it would remain, the air-pressure meanwhile flowing into the gun-barrel until the connection with the open air was closed and pressure readmitted to the chamber $d^2$, when the force acting on the back of the valve, far exceeding that on the shoulder M' and the face of the valve, on account of the larger area of the back of the valve, the valve would be closed with a speed depending upon the rapidity with which the pressure was allowed to return to the chamber $d^2$. To accomplish this—that is, to alternately release and apply the pressure upon the back of the valve M in chamber $d^2$—I have devised what I call "auxiliary valves," which I have made in several different forms and sizes, but the best example of which, fulfilling all the conditions required in the most perfect manner, I here describe and represent on Sheets 7, 8, and 9. It consists, primarily, of a casting $D^8$, bolted on the firing-valve casing $D^6$, Sheets 7, 8, and 9, having two hollow cylinders side by side of different diameters, each adapted for a suitable piston-valve. The larger cylinder $d^3$ is closed at the back end by a bonnet $D^9$, the attaching-bolts not being shown. The valve itself K consists of a double piston in one piece, the smaller end of which is marked $K^2$ and the larger end $K'$ and plays in this cylinder, the middle being turned down so as to leave an annular space surrounding that part of the piston, which space forms a free communication between the two passages $d'$ $d^2$, each of which, continuing through the casting, is changed into the form of a round duct $d^6$, ending in a flange $D^{15}$. (Shown in plan on Sheet 7, Fig. 15, and in vertical section, Sheet 8, Fig. 19.) The front face of the piston $K'$ rests against a packing-ring of fibrous material $D^{14}$, which is held by the gland $D^{10}$, which also acts as a guide for the valve-stem $K^3$. The flange $D^{15}$ is bolted upon a boss (shown in Fig. 16, Sheet 7) cast on the upper side of the firing-valve casing, which boss has two holes in it, one being a continuation of duct $d^6$ and leading to the firing-valve chamber $d^2$, and the other being a continuation of duct $d^7$ and leading to the air passage $d'$ in the firing-valve casing, in which the reservoir-pressure is maintained.

The manner in which the auxiliary-valve casting $D^8$ is attached to the firing-valve casting is shown clearly in Sheet 8, Fig. 20, where $D^6$ is the firing-valve casing, $d'$ the annular chamber, $d^2$ the firing-valve chamber, and $D^{20}$ the boss to which the flange $D^{15}$ is bolted, (bolts not shown,) and $d^6$ $d^7$ the ducts in continuation of those so marked on Sheet 7. It is evident that the pressure in the air-passage $d'$ is free to flow through duct $d^7$ up into the annular space around the valve K and back through duct $d^6$ into the firing-valve chamber $d^2$. In this position of the valve, however, the air-pressure between the pistons would drive the valve backward toward the bonnet by reason of the greater area of the piston K' over the area of the piston K², and this is intended should be done when the gun is to be fired. At all other times the valve is held against the seat by the reservoir-pressure acting against the back of the valve between the piston K' and the bonnet D⁹. Should this pressure be at any time released, the pressure existing between the pistons will at once force the valve back toward the bonnet, in which direction its motion is limited by a projection D⁹* upon the bonnet, which stops the valve upon a buffer of fibrous material K⁵, to receive which the valve is hollowed out, as shown in part section on Sheet 9.

That part of the cylinder D⁶ which separates the passages $d'$ $d^2$ is bored out to the same size as that in which the piston K² is shown in the drawings, and its relation to the motion of the valve J is such that when the piston is driven back upon the buffer K⁵ the piston K² occupies this part of the cylinder, (see Sheet 9,) and forms a complete stop to the passage of air from passage $d'$ to passage $d^2$. When the valve K is in this position, (see Sheet 9,) having left its seat D¹⁴, the passage $d^2$ is in communication with the open air and the space in the firing-valve chamber $d^2$ is also in communication with the open air through the duct $d^6$. The reservoir-pressure being cut off by the piston K² and the pressure already existing at the back of the firing-valve in the chamber $d^2$ being allowed to escape through the duct $d^6$ through the gland D¹⁰, the firing-valve is opened, as already described, by the reservoir-pressure acting upon the annular shoulder M' of the firing-valve. If, when the firing-valve chamber $d^2$ is thus emptied and the firing-valve opened, the reservoir air-pressure should be again applied to the back of the valve K, it would be returned to its seat D¹⁴, the communication with the open air cut off, and the reservoir-pressure allowed again to flow through the duct $d^7$ into $d^6$, and thence into the firing-valve chamber $d^2$, and the firing-valve would be forced back upon its seat in the breech-ring, and thus closed. The operation of opening and closing the firing-valve is therefore accomplished by opening and closing the valve K, the balance of reservoir-pressure being directed against or excluded from the back of the firing-valve to open or close it by the action of this valve. If the valve K was made small enough it might possibly be operated by hand; but the space $d^2$ contains a large amount of air and as the operation of opening and closing the firing-valve has to be performed in a small part of a second the ducts leading to and from the space $d^2$ have to be of such a size that it may be exhausted of its pressure and refilled with a speed that is practically instantaneous, and the valve K controlling the flow must be correspondingly large, and with the heavy pressure upon it— usually one thousand pounds per square inch—the efficient manipulation of the valve K could not be effected by hand. It becomes necessary, therefore, to provide some means within the easy control of the hand by which this valve K may be thrown back and forth. To accomplish this is the purpose of the small valve J, working in the cylinder $d^4$ of the valve-casting D⁸. This valve J acts upon the valve K to release and return the reservoir-pressure upon the back of the piston K' in the same manner that the valve K itself acts upon the firing-valve. Its construction is shown in Sheet 7, Fig. 15, where J' is a disk upon the valve fitting accurately but easily that portion of its cylinder marked $d^*$ and resting upon a seat in the gland D¹⁶, which also serves for a guide for the valve-stem J³. The rest of the valve is of a smaller diameter and slides with a close but working fit in that part of the cylinder $d^4$ in which it is shown. This part of the valve is hollow, as shown in section, and has a number of holes $j$ drilled into the interior, these holes being in such a position that when the valve is resting upon its seat the holes are just beyond the smaller part of the cylinder $d^4$ and open into the annular space in that cylinder seen in the drawings, from which a port $d^8$ opens to the cylinder $d^3$ at the back of the valve K. A hole is drilled into the cylinder $d^4$, and into this hole is screwed an elbow-shaped casting D¹¹, (shown in plan in Sheet 7, Fig. 15, and in vertical section in Fig. 2,) having a flange, as shown. This flange is bolted to another boss as flange D¹⁵ is bolted on the top of the firing-valve casing, and the hole is continued through the casting and boss, as a duct, (marked $d^9$ in Sheet 7, Fig. 16, and Sheet 8, Fig. 20.) As this duct opens into the same air-belt of the firing-valve casing that the duct $d^7$ opens into and that contains reservoir-pressure, it is evident that when the valve K is in the position shown in Sheet 7, Fig. 15, the reservoir-pressure can flow through the duct $d^9$ into the interior of the valve J and through the holes $j$, and then through the port $d^8$ to the back of the valve K, this being the manner in which the pressure is maintained on the back of the piston K' to keep its attached piston K² against its seat. The end of the valve-stem J³ beyond the gland D¹⁰ has fitted upon it with a working fit the square end of a valve-rod N', as shown on Sheet 7, and indicated also on Sheets 1 and 2, where it is shown in connection with a hand-lever N, working on a quadrant. This square end of the valve-rod not only has a round hole into which the valve-stem J³ may slip, but it is slotted across to receive a catch O, as shown in Fig. 1, and in Fig. 4, which is a side view of the square end of the valve-rod. The catch O has a short arm the end of which bears against the end of the valve-stem J³, and a long arm the end of which is slotted end embraces the valve-stem K³ of the valve K. A collar K⁴ is secured upon the outer end of the valve-stem $K^3$ in such a way that if the valve K is moved back from its seat a sufficient distance it will strike the long arm of the catch O, and as its movement is continued it will trip the short arm of the catch from the valve-stem $J^3$. (See Sheet 9.) When the valve K returns to its seat, the spring O' will return the catch to its position, as shown in Sheet 7.

Having now described all the parts of the auxiliary valve and its connections on the one side with the firing-valve by means of its ducts and on the other side to the hand of the operator by means of the catch O and the valve-rod and hand-lever, it remains to show the course of events which follow the moving of the hand-lever N from the position shown in the general plan, Sheet 2, to the other end of its movement on its quadrant, which is all that is necessary for the gunner to do when he receives the order to fire. This movement of the hand on the long end of the lever N is so reduced on the short end that the valve-rod N', with its catch O, will move the valve-stem $J^3$ only the distance indicated on Sheet 9, showing the movement of the catch. As the valve J moves with its stem the first result is to cover the line of holes $j$ by the small part of the cylinder $d^4$, and thus cut off the reservoir-pressure from the small cylinder and from the back of the valve K. The valve J still moving, the disk J' passes out from the part of the cylinder into which it fits at $d^5$, thus opening communication with the open air through the gland $D^{16}$, and the pressure on the back of the valve K is instantly released. The excess of pressure upon the larger piston over that upon the smaller piston $K^2$ at once drives the valve K back toward the bonnet, its motion being limited by the buffer $K^5$, (see Sheet 9,) and the air-belt $d'$ and duct $d^7$ being thus opened to the air through the gland $D^{10}$ the pressure is released from the space $d^2$ at the back of the firing-valve, which valve immediately opens, allowing the reservoir-pressure to flow into the breech of the gun and throw the projectile. The valve K in making this movement has pulled the catch O into the position shown in Sheet 9, and thus releases the valve-stem $J^3$ from the detaining action of the short arm of the catch. The reservoir-pressure, which is all the time acting on the end of the valve J at the hole $d^9$ now pushes the valve J back to its seat, first cutting off the communication with the open air, and then restoring the reservoir-pressure through the holes $j$ into the cylinder $J^2$ and against the back of the valve K, which instantly shuts against its seat, thus cutting off the open-air communication through the gland $D^{10}$ and restoring the reservoir-pressure in the belt $d'$ and through the ducts $d^6\ d^7$ into the chamber $d^2$ of the firing-valve casing, upon which the firing-valve M itself closes, cutting off the reservoir-pressure from the gun-barrel.

At any time after the firing the gunner may move the hand-lever N back into the position shown in Sheet 2, ready for firing again; but it is immaterial when this is done, as his action in so doing has no effect upon the valve. All that happens then is that the valve-rod N' is drawn away from the valve-stem $J^3$ into the position shown in Sheet 7, Fig. 15, and the spring O' returns the catch O into the position there shown, and the valve is then ready for another firing.

When the gun is to be fired, it is necessary that the firing-valve shall be opened as rapidly as possible, so as to allow the full pressure of the air to enter without obstruction into the breech of the gun. Consequently no obstruction is placed in the duct $d^6$. The passage of the air-pressure from the back of the firing-valve to the open air through the gland $D^{10}$ is either absolutely prevented, as shown in Sheet 7, Fig. 15, by the valve K being on its seat, or it is entirely open, as already explained, and shown in Sheet 9; but it is otherwise with the return of the firing-valve to its closed position.

It may be desirable to hold the firing-valve open to allow the reservoir-pressure to follow the projectile to the muzzle of the gun; or if the gun is to be fired at short range it may be necessary to cut off the pressure very early in the travel of the projectile.

The speed with which the firing-valve will be closed depends on the rapidity with which the reservoir-pressure can find its way back into the chamber $d^2$ after the valve K is closed, and to regulate this return of pressure is the object of the stop-cock L. (Shown in plan in Sheet 7, Fig. 15, in horizontal section in Fig. 2, and in vertical section in Sheet 8, Fig. 19.)

Referring to Sheet 8, Fig. 19, the duct $d^7$ is bored out to a larger diameter at the point where it changes its horizontal to vertical direction, and in this larger diameter there is inserted a stop-cock L, with openings $l$ at right angles to each other of the full size of the duct. The upper end of this stop-cock is cast with a stem $L^*$, around which is fitted a screw-gland $D^{17}$, with packings X X' to prevent the leakage of air around the joints. To the upper end of this stem is fitted a quadrant-handle L'. (Shown also in plan in Sheet 7, Fig. 15.) This quadrant-handle has two slots in it, through one of which $l'$ a thumb-screw $L^2$ passes, by which it may be fastened at any point between "fully open" and "fully shut" upon the post $D^{18}$, provided for that purpose. The other slot $l^2$ has a pointer passing through it, which indicates the exact position of the stop-cock L against the arc on the quadrant-handle, the arc being graduated, as shown on the drawings, from 0 to 100, indicating the amount of opening, 0 indicating no opening, 100 indicating fully open. This arrangement is fully shown in Sheet 7, Fig. 15, the pointer showing the stop-cock to be wide open and the dotted lines of the duct $d^7$ showing the opening of the stop-cock to be coincident with the opening of the duct. In the section of the ducts $d^6\ d^7$, Sheet 7, Fig. 16, the stop-cock is shown as half closed—a position which would be indicated on the graduated scale by the pointer being at 50. It is evident that with this stop-cock the return of the pressure forcing the air from the belt $d'$, Sheet 8, Fig. 20, around through the auxiliary valve K to the firing-valve chamber $d^2$ at the back of the firing-valve, may be regulated to any degree, so as to give any desired range within the limits the gun has, with any elevation, and the same recorded in a table. If the stop-cock L is set entirely open, as shown in dotted lines, Sheet 7, Fig. 15, the reservoir-pressure having free access to the back of the firing-valve, the latter will be closed very quickly, whereas if the stop-cock L was nearly closed the firing-valve M might remain open so long that the entire contents of the reservoirs $A^6$ $A^7$ would be exhausted into the open air through the barrel D of the gun.

In order to accomplish the proper regulation of the flow of air through the regulating-cock L, I make the opening in the shell of such cock of an approximately triangular form, so as to afford a finer graduation of the flow when the cock is nearly closed. The shape of the opening is shown unfolded in Sheet 9, Fig. 23. The duct $d^9$, that conveys reservoir-pressure to the back of the small valve J, is provided with a similar stop-cock * in the casting $D^{11}$, Sheet 7, Figs. 15 and 17. Its construction is in all respects, except as to size, similar to that of the stop-cock L, just described. Its purpose, however, is somewhat different, being to regulate the speed of the return of the valve J to its seat, if it is found necessary to do this, so that it will not impinge on its seat with destructive violence.

I will now describe the mechanism for training the gun to any point on the horizon, the gun being capable of what is known as "all round train." As I have found by experience that the motor for training should not have a fly-wheel, the momentum of which carries the gun around farther than the point intended, and the use of which renders the training of the gun a matter of uncertainty and delay, I use a multiple-cylinder hydraulic motor. (Shown in plan on Sheet 1, Fig. 2, and there designated P, also on Sheet 11.) There being in such a motor no appreciable momentum of the moving parts and no dead-center to be overcome by the stored-up energy of a fly-wheel, the pressure of the motor is a constant quantity and admits of a precision of movement and stoppage of the gun in training not attainable with rapidly-moving motors. The motion of this motor may be used in various ways to train the gun; but I have shown in these drawings a pinion on the shaft working into the teeth formed on the inside of the circular track $A^3$, upon which the carriage rolls as it is trained, wheels $B^6$ being attached to the under side of the carriage to receive the weight of the entire moving parts and transfer it to the track $A^3$, which is strong and set upon a firm foundation. The motor P, Fig. 2, Sheets 1 and 11, is securely fastened to a casting $B^7$, which is itself bolted firmly to the channel-bars $B^3$, forming the longitudinal frame of the carriage. The shaft of the motor projects through this frame into a bearing long enough to reach to the teeth of the wheel below, as shown in Sheet 1, Fig. 3, where P is the motor; $B^7$, the casting to which it is fastened; $B^3$, the channel-bars of the carriage, and $B^8$ the bearing for the shaft, $P'$ being the pinion working into the stationary internally-toothed wheel, which is shown in Fig. 1 and designated $A^4$. This arrangement is also partly shown on a larger scale in Sheet 11.

To elevate the gun to the required angle for attaining the range desired for the projectile, I use a hydraulic ram, (marked Q R in Sheet 1, Fig. 1, and in the plan view, Fig. 2, of same sheet.) It consists of a barrel Q (see Sheet 1, Figs. 1 and 2,) trunnioned at the lower end, where it is carried by two trunnions $Q'$ in bearings $Q^4$, bolted to the channel-bars $B^3$. Within this barrel is a ram R, having one end formed into a fork, each end of which fits into a bearing $D^{13}$, Sheet 2, securely bolted to the channel-bars $D^3$, which constitute the truss for the barrel. The lower end of the ram R is formed into a piston working in the barrel Q and provided with cup-leather packing, Sheet 11. The liquid-pressure for actuating this ram is introduced through one of the trunnions $Q'$. (See Sheets 1 and 11.)

In order to convey the motive fluid from the stationary parts of the system to the motors for training and elevating the gun, which revolves with it, I have devised the system of ducts, pipes, valves, and controlling-levers shown in Sheets 10 and 11.

Fig. 24 in Sheet 10 shows the method of uniting the stationary ducts, containing live and exhaust pressures in the pintle, with pipes that revolve with the gun and convey the motive fluid to and from the valve-ducts, from whence they are distributed. $A^*$ is a portion of the pintle, on each side of which a duct is formed either by coring or boring through the solid part of the pintle, avoiding the openings $a$, which are made through the side of the pintle for the transmission of air, $a'$ being the duct for the live pressure, and $a^2$ that for the exhaust-pressure; the arrangement of these ducts being shown also in Fig. 2, which is a plan view in section of the pintle. From the upper ends of each of these openings stationary pipes $a^3$ are led to a chest $A^5$, which is in the exact axis of the movable parts of the system. This chest $A^5$ is so constructed as to receive the pipes that revolve with the gun and secure them by suitable packing against leakage. The central pipe $b'$ conveys the oil upward under pressure, and a larger passage $b^5$, surrounding the central pipe $b'$, conveys the exhaust-pressure downward. The upper portion of the central pipe is shown at $b'$ in Sheet 11, Figs. 27 and 28, from which it branches by two pipes $b^2$ $b^3$ to the valve-chests $P^5$ $Q^5$, where its flow is controlled by valves $P^4$ $Q^4$, (shown in section on Sheet 11, Fig. 27,) which valves are moved by hand-levers $P^2$ $Q^2$, working against a quadrant $D^{19}$. The lever $Q^2$ moves the valve $Q^4$, that admits pressure to or allows exhaust from the elevating-ram Q R, and $P^2$ is the lever by which pressure or exhaust may be made to operate alternately to actuate the driving-motor P in either direction. These levers, when placed in the center of their movement on the quadrant $D^{19}$, bring to a stop the elevating and training mechanism. On Sheet 11 the training-lever $P^2$ is shown at that end of its movement where it brings the valve $P^4$ into such a position that it allows pressure to flow through the pipe $p$ and exhaust to return along the pipe $p'$, and so revolve the motor P as to turn the gun. Shifting the training-lever $P^2$ to the opposite extreme of its motion reverses the valve $P^4$ and sends the pressure through the pipe $p'$, and allows the exhaust to return through the pipe $p$, so revolving the motor P in the opposite direction with the opposite effect on the turning of the gun.

The lever Q for elevating the gun is shown at that end of its movement which allows the pressure to act upon the elevating-ram Q R and raise the gun. When shifted to the other end of its movement, it allows the motive fluid to return along the same pipe, and the valve $Q^4$ directs it into the exhaust-pipe to the exhaust-duct $a^2$ of the pintle, the valve being single acting. These valve-chests $P^5$ $Q^5$ are suitably connected by pipes $p$ $q$ to the double pipe in the central axis of the pintle, as shown in Sheets 10 and 11.

Sheet 12 shows a modification of the pintle in which the ducts for the live and exhaust pressures are in the center.

In case of any accident happening to the elevating-ram I provide mechanism for elevating by hand-power. This consists of two worm-wheels S, Sheet 1, Figs. 1 and 3, the hubs of which are fitted into a yoke U, resting in suitable bearings $B^9$ on each side of the frame. These worm-wheels serve as nuts for two strong screws V, the upper ends of which support the channel-bar truss $D^3$. A shaft S, provided with two worms, is adjusted in bearings, so that the worms act upon the wheels, and cranks S' at each end of the shaft are worked by men standing at the forward end of the platform of the gun. The screws of this apparatus when not in use are turned down to a low point and then form a rest for the gun-barrel with its truss when the same is level. The screws are shown in this position in Sheet 1, Fig. 1; or they may be, if preferred, kept at such a height as to form a support at the loading-angle.

The reservoirs for holding the air and for firing the gun, which I call the "firing-reservoirs," are preferably placed as near the gun as possible. I have arranged them in two groups $A^6$ $A^7$ exactly opposite each other and connected by manifolds $A^8$ and suitable pipes $A^9$ to the pintle. When the gun is fired, the pressure in all the air-spaces is reduced instantly, the base of the recoil being on the outer ends of the reservoirs $A^6$ $A^7$, the effort, although balanced so far as the pintle is concerned, tending to rend the connections apart. I connect the two groups of firing-reservoirs to each other by the strong tie-bars $A^{10}$, which I have shown in Sheets 1 and 3 as connecting the ends of the manifolds $A^8$, that being the most favorable position for them in such an arrangement as I have shown. These tie-bars take up the entire recoil due to the release of part of the pressure in the firing-reservoirs and relieve the pintle and pipes of the strains that would act upon them in consequence of this recoil.

There might be situations in which four or six groups of firing-reservoirs would be convenient, or the gun might be entirely surrounded by reservoirs of compressed air; but in all such cases the same recoil would tend to break the connections of the reservoirs with the pintle, and the employment of the bars uniting the opposite reservoirs or groups of them, as the case might be, effectively guards against undue strains upon the apparatus.

As it is desirable to be able to load the gun at any point of the circle to which it may be trained, I have provided a circular track at such a distance from the training center as will bring the projectile mounted on a suitable carriage into the proper position for introduction into the gun-barrel. This track is shown in plan on Sheet 2, its rails being there marked $A^{11}$, and in sectional elevation marked by the like letters on Sheet 1.

The projectile-carriage T is made with wheels of proper diameters to roll easily and naturally on this circular track, and is provided with a trough $t$ for safely holding the projectile, and with a ram T', running on slides and worked by chains running over sprocket-wheels for pushing the projectile steadily and without shock into the barrel of the gun.

The sprocket-wheels are attached to or cast with gear-wheels, the latter being operated from a pinion-shaft extending from side to side of the carriage and turned by cranks in the hands of the men engaged in loading the gun.

In the drawings, Sheet 1, I have shown the projectile-carriage constructed for loading the gun at an angle of eight degrees. This enables the carriage to be lower than it would be if the gun was brought to level for loading.

I have found that the ordinary stuffing-box and gland are incapable of preventing leakage by the stems of valves under the heavy pressure necessarily used in pneumatic guns, and I have devised a specially efficient method of packing such stems. (Shown in Sheets 7 and 8, where I employ it for packing the stems of the regulating stop-cock L, and * there shown.) It consists of a ring of leather or other flexible material L⁴, held between the face of the collar L³ on the stem L* and the bottom of the recess into which the collar fits. The internal pressure of the air in the chamber holds the collar tightly against the leather seat, the pores of which are filled with paraffine or some such medium, and is therefore absolutely tight against the passage of air.

The several devices set forth herein for training and loading are not dedicated to the free use of the public, but are made the subject of two applications, one filed July 29, 1889, Serial No. 319,024, and the other filed July 29, 1889, Serial No. 319,025, in Letters Patent as divisions of this application.

Modifications may be made without departing from the principle or sacrificing the advantages of the invention.

I claim as my invention—

1. The hollow pintle for pneumatic guns, provided with the air-passages $a$ and having both ends closed, in combination with a yoke B, carrying the gun and revolving thereon, as set forth.

2. The combination, with the yoke and hollow pintle supporting the gun-carriage, of the reservoirs arranged in series on opposite sides, and communicating therewith, substantially as set forth.

3. The combination, with the yoke and hollow pintle supporting the gun-carriage and the reservoirs, of the manifolds connecting the reservoirs in series and communicating with the pintle and the tie-rods connecting the series of reservoirs, as set forth.

4. The combination of the hollow fixed pintle A, supporting the gun-carriage, having annular flange $A^2$ $b^*$, and the yoke B, provided with the belt $b$, and air-passages encircling the pintle and supported by the flange $b^*$, as set forth.

5. The combination, with the hollow pintle supporting the gun-carriage, of the yoke rotating thereon, having air-passages, as shown; the gun-carriage secured to the yoke and carrying the gun-barrel and suitable valves and operating mechanism, the circular track arranged concentrically with the pintle, and the wheels secured to the carriage and moving on the track, as set forth.

6. In combination with the gun and supporting-yoke and suitable connection therefor, the pintle A, inclosing independent passages adapted one set $a$ $a$ to convey fluid from the reservoir for impelling the projectile, and another set $a'$ $a^2$ to convey fluid to the carriage for changing the position of the gun, as herein specified.

7. In a pneumatic gun, the hollow pintle A, closed at the top and bottom and having apertures $a$ communicating radially with a carriage arranged to revolve thereon, the trunnions E, having apertures at one end, the gun-barrel D, and reservoirs $A^6$ $A^7$, and connections between the several joints, in combination with each other and with the belt $b$, and pipes $b'$ $b^2$ $b^3$ $b^4$, conveying fluid independently to such carriage, and mechanism carried on the carriage for changing the position of the barrel by fluid transmitted through such connection, all substantially as herein specified.

8. The combination, with the hollow pintle of the gun-carriage, of the rotary yoke mounted thereon, having air-passages communicating therewith, and having nozzles B', the hollow trunnion-blocks B⁴ secured on said nozzles, and the gun-barrel D, supported by the said trunnion-blocks, as set forth.

9. In a pneumatic gun, the hollow trunnions E, made separate with closed ends and having the nozzles E' and pipes $e'$, in combination with the gun-barrel D and secured thereto, as set forth.

10. Hydraulic packing interposed between the movable joints of a pneumatic gun, in combination therewith and with provisions for supplying liquid at a high pressure to the spaces, as set forth.

11. In a pneumatic gun, the combination of the reversed U-shaped packing-rings C C, interposed between two parts in such packing, the perforated distance-rings C' between the packing-rings, adapted to allow the movement of the liquid filling the spaces between the packing-rings, and means for holding the packing-rings in place, as set forth.

12. The gun-barrel D, having apertures $d$ arranged around the breech, in combination with the annular firing-valve M, inclosing the breech, and hydraulic packing arranged to cover and uncover the openings $d$ by axial movement, as set forth.

13. In a pneumatic gun, the combination of the differential cylinder, the double piston fitting therein, the pipe $f$, leading from the upper end of the said cylinder to one of the air-passages, and the pipe $f^3$, leading from the lower end of the cylinder to the packings of the gun, as set forth.

14. In a pneumatic gun, the annular firing-valve M, inclosing the breech and formed with thicker rear edge of the gun-barrel and adapted to move longitudinally thereon, inclosed in a chamber of corresponding form and arranged to be opened and closed by varying the pressure on the thicker edge, in combination with hydraulic packing, as set forth.

15. In a pneumatic gun, the firing-valve M, inclosing the breech, in combination with hydraulic packing applied around the breech between the same and such firing-valve, and with the auxiliary valve K, for changing the pressure in the firing-valve chambers, as specified.

16. In a pneumatic gun, the firing-valve M, inclosing the breech, in combination with hydraulic packing and with two automatic auxiliary valves J K, and means for controlling the admission of air to the valve J, all arranged to mutually coact, substantially as herein specified.

17. In a pneumatic gun, one or more auxiliary valves J K, arranged in parallel relation to each other, and a firing-valve M, inclosing the breech and connected to be operated by the changes of pressure in its chamber, in combination with an automatic detaching device O, arranged at right angles to and in the path of the stem of one of the said auxiliary valves, as herein specified.

18. In a pneumatic gun, the two auxiliary valves J K, combined with the catch O, arranged in the path of the stem of one of said valves, the spring O', arranged to act on said catch, the operating-rod N', connected with the said catch, and firing-valve M, inclosing the breech, arranged to serve as herein specified.

19. In a pneumatic gun, the firing-valve M, inclosing the breech, auxiliary valve K, and provisions for operating the latter, in combination with each other and with the adjustable cock L, controlling the outlet from the reservoir to the back of the firing-valve and arranged to limit the time in which the air-pressure is restored to close the valve M, substantially as herein specified.

In testimony whereof I have hereunto set my hand, at New York city, New York, this 13th day of March, 1889, in the presence of two subscribing witnesses.

GEO. H. REYNOLDS

Witnesses:
CHARLES R. SEARLE,
CHAS. F. BARTER.